US012789704B2

(12) United States Patent
Song

(10) Patent No.: US 12,789,704 B2
(45) Date of Patent: Nov. 10, 2026

(54) MIRROR ASSEMBLY

(71) Applicant: LG ELECTRONICS INC., Seoul (KR)

(72) Inventor: Kiman Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 18/233,049

(22) Filed: Aug. 11, 2023

(65) Prior Publication Data

US 2024/0300415 A1 Sep. 12, 2024

(30) Foreign Application Priority Data

Mar. 7, 2023 (KR) ........................ 10-2023-0030062
Apr. 11, 2023 (KR) ........................ 10-2023-0047529

(51) Int. Cl.
*B60R 1/12* (2006.01)
*B60R 1/04* (2006.01)

(52) U.S. Cl.
CPC .................. *B60R 1/12* (2013.01); *B60R 1/04* (2013.01); *B60R 2001/1253* (2013.01)

(58) Field of Classification Search
CPC ..... B60R 1/12; B60R 1/04; B60R 2001/1253; B60R 1/086
USPC .......................................................... 359/872
See application file for complete search history.

(56) References Cited

U.S. PATENT DOCUMENTS 8,267,559 B2 9/2012 DeLine et al.
9,694,752 B2 7/2017 Kuester
9,718,409 B2 8/2017 Kuester et al.
9,963,075 B2 5/2018 Hallack et al.
10,029,615 B2 7/2018 Hallack
10,112,540 B2 10/2018 Minikey, Jr. et al.
10,131,279 B2 11/2018 Minikey, Jr. et al.
10,300,858 B2 5/2019 Roth et al.
10,464,485 B2 11/2019 Lundy et al.

(Continued)

FOREIGN PATENT DOCUMENTS

JP 2005-119562 5/2005
KR 20-0131741 12/1998

(Continued)

OTHER PUBLICATIONS

European Patent Office Application Serial No. 23197594.7, Search Report dated Mar. 18, 2024, 8 pages.

(Continued)

*Primary Examiner* — Bumsuk Won
*Assistant Examiner* — Rahman Abdur
(74) *Attorney, Agent, or Firm* — LEE, HONG, DEGERMAN, KANG & WAIMEY

(57) ABSTRACT

Provided is a mirror assembly. The mirror assembly includes a housing provided with a hinge shaft, a cover provided with a connection portion rotatably connected to the hinge shaft, a slider disposed between the housing and the cover and provided with a hook, an elevation shaft disposed below the slider, and a button configured to support the elevation shaft. A hook holder with which the hook is engaged is disposed on the housing, the slider includes a protrusion surface configured to slide along an outer surface of the hook holder, and an angle of the slider is varied based on contact between the protrusion surface and the outer surface of the hook holder.

14 Claims, 10 Drawing Sheets

(56) References Cited

U.S. PATENT DOCUMENTS

| | | | | |
|---|---|---|---|---|
| 10,464,488 | B2 | 11/2019 | Kuester | |
| 10,506,166 | B2 | 12/2019 | Kuester et al. | |
| 10,543,787 | B2 | 1/2020 | Kuester et al. | |
| 10,583,782 | B2 * | 3/2020 | Blank | B60R 1/12 |
| 10,596,968 | B2 | 3/2020 | Thelen et al. | |
| 10,696,230 | B2 | 6/2020 | Hallack et al. | |
| 10,705,332 | B2 | 7/2020 | VanderPloeg et al. | |
| 10,710,507 | B2 | 7/2020 | Kuester et al. | |
| 10,723,270 | B2 | 7/2020 | Fish, Jr. et al. | |
| 10,800,335 | B2 | 10/2020 | Hallack et al. | |
| 2003/0117728 | A1 * | 6/2003 | Hutzel | B60R 11/0217 359/850 |
| 2005/0085100 | A1 | 4/2005 | Wada | |
| 2006/0061008 | A1 * | 3/2006 | Karner | G09G 5/026 264/250 |
| 2011/0242667 | A1 * | 10/2011 | Kulas | B60R 1/04 359/630 |
| 2018/0118115 | A1 | 5/2018 | Kuester et al. | |
| 2018/0319340 | A1 | 11/2018 | An | |

FOREIGN PATENT DOCUMENTS

| | | |
|---|---|---|
| KR | 10-2018-0123352 | 11/2018 |
| KR | 10-2019-0077355 | 7/2019 |

OTHER PUBLICATIONS

Korean Intellectual Property Office Application No. 10-2023-0047529, Office Action dated Sep. 28, 2024, 3 pages.

Korean Intellectual Property Office Application No. 10-2023-0047529, Notice of Allowance dated Dec. 2, 2024, 1 pages.

* cited by examiner

【FIG.1】
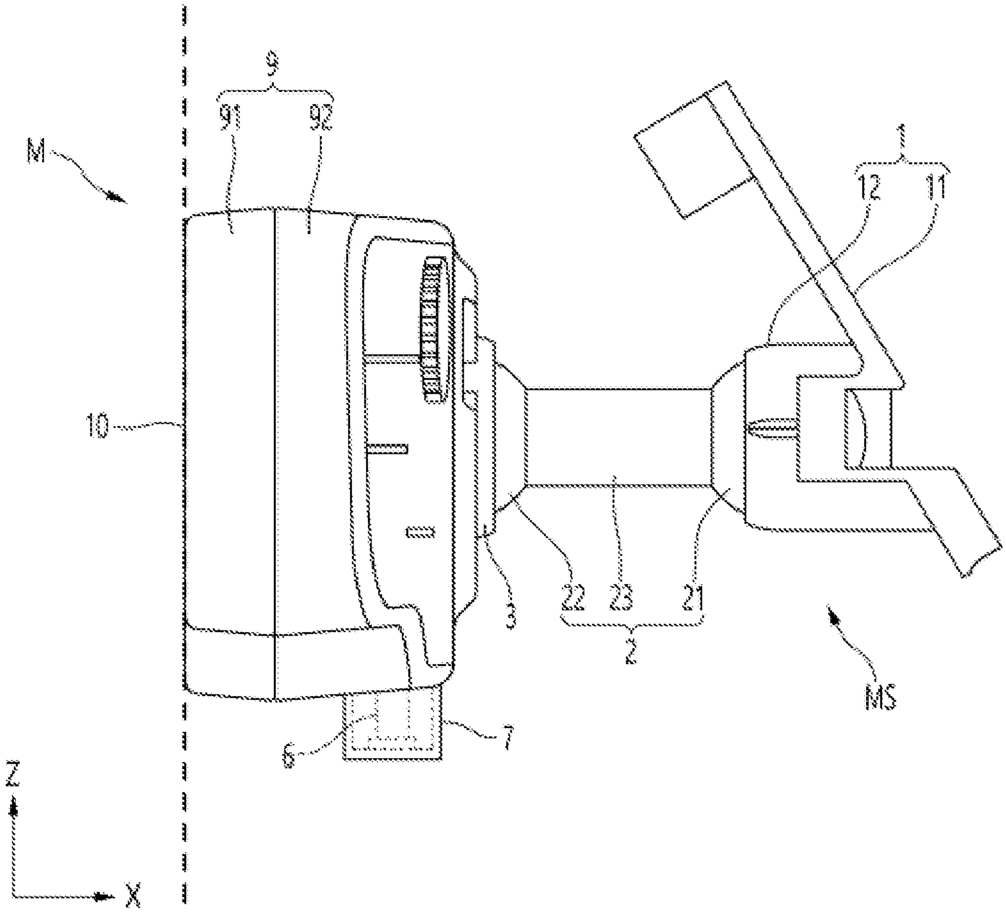

【FIG.2】
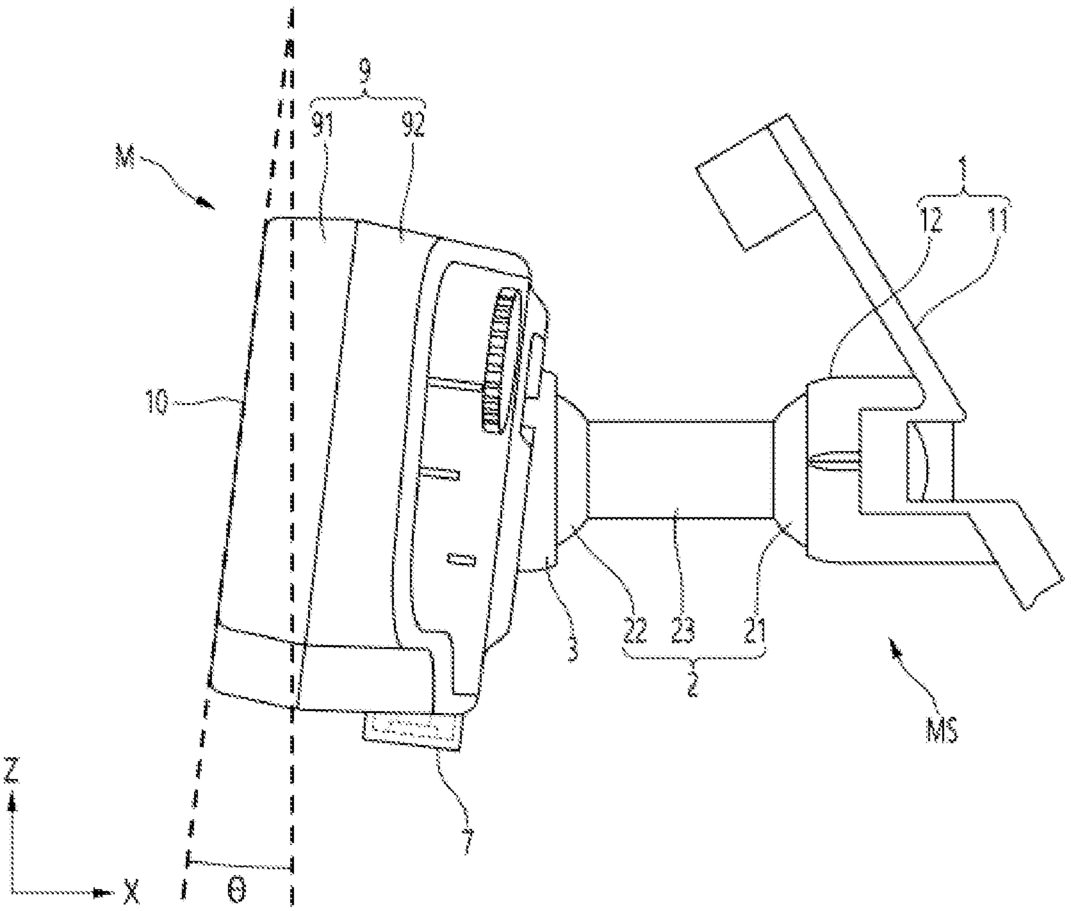

【FIG.3】
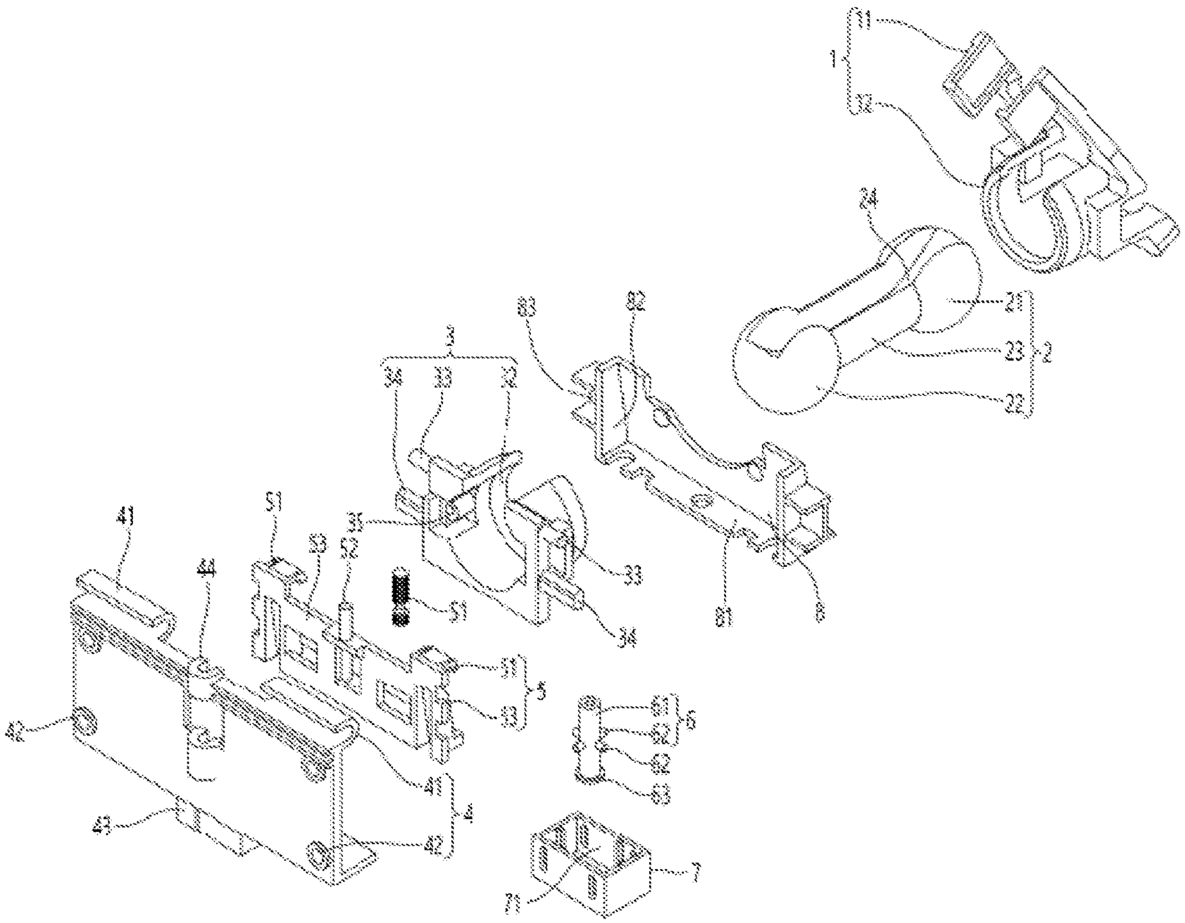

【FIG.4】
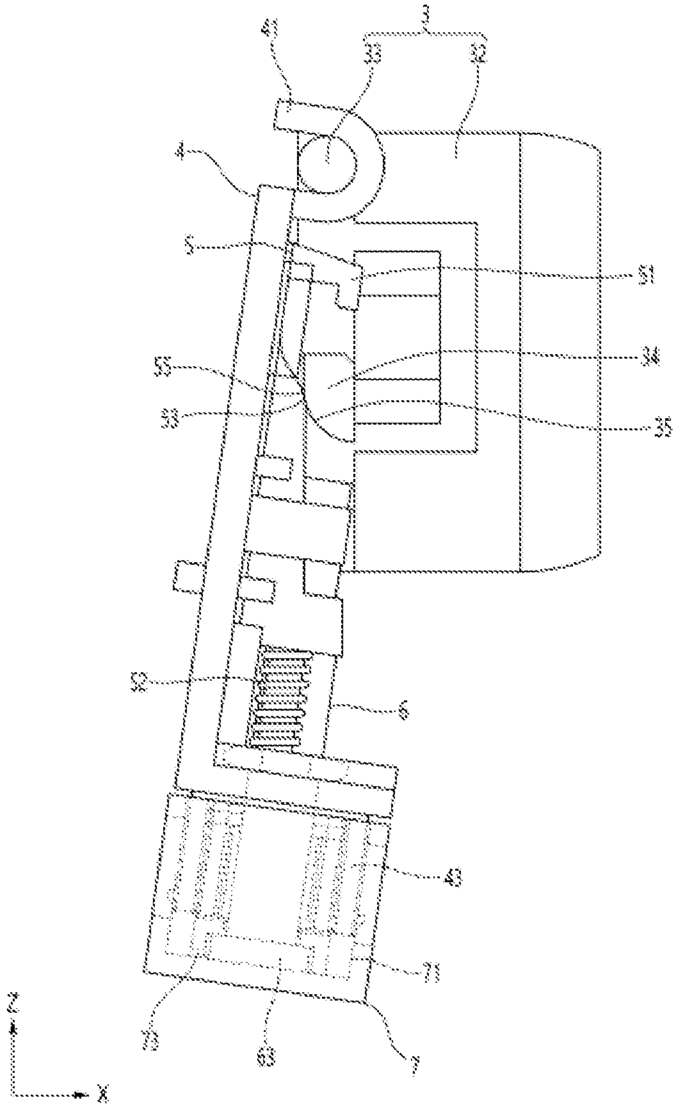

【FIG.5】
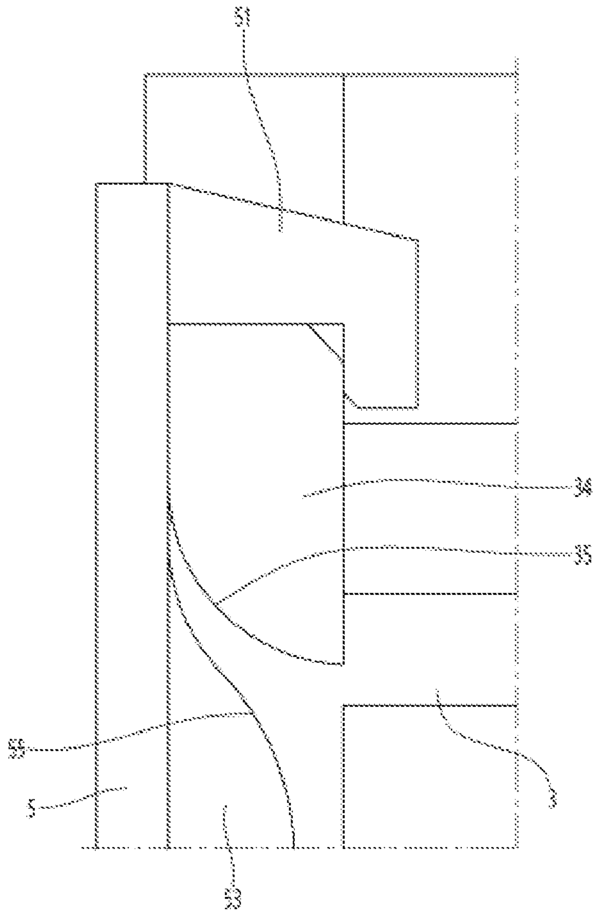

【FIG.6】
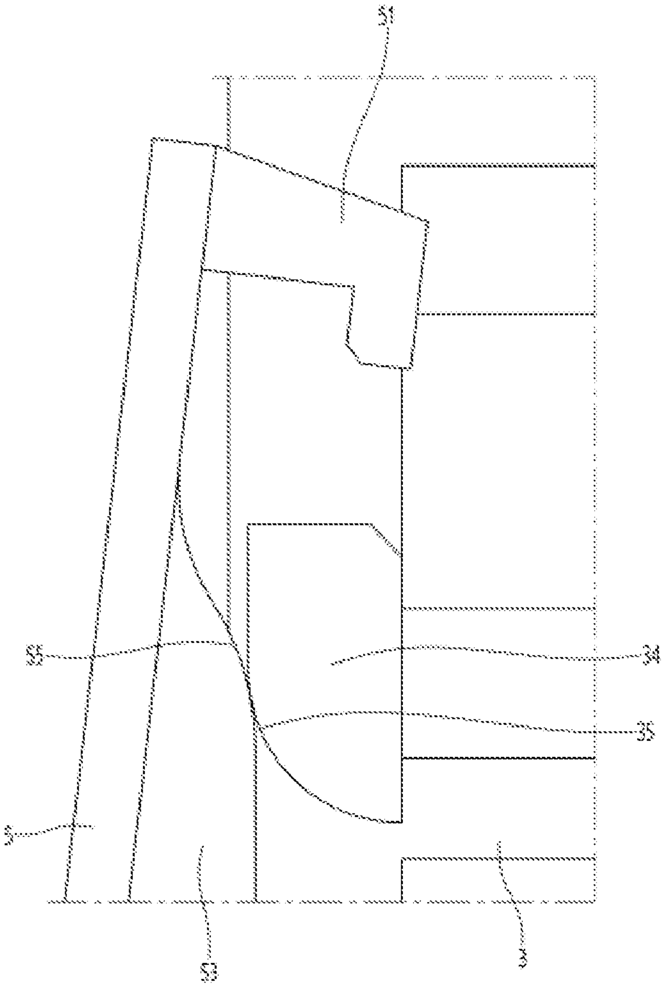

【FIG.7】
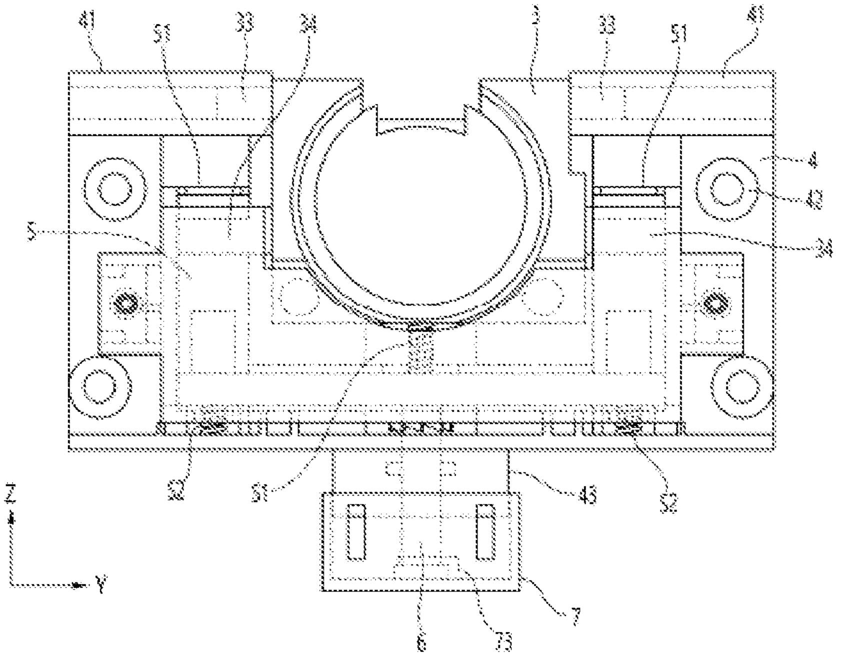
【FIG.8】
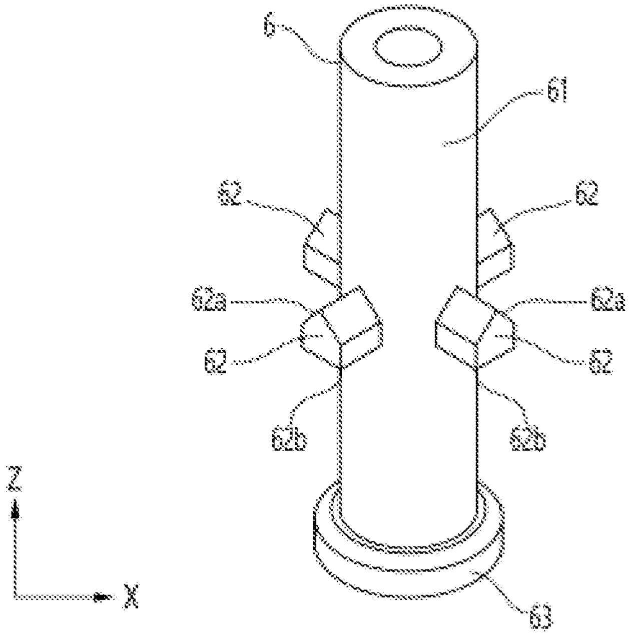

【FIG.9】
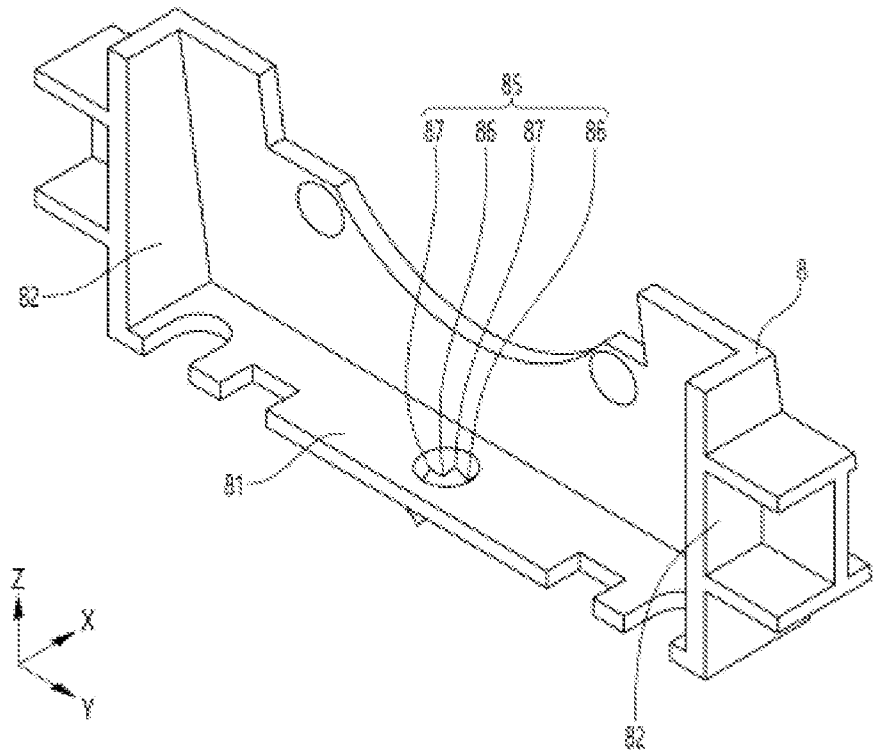
【FIG.10】
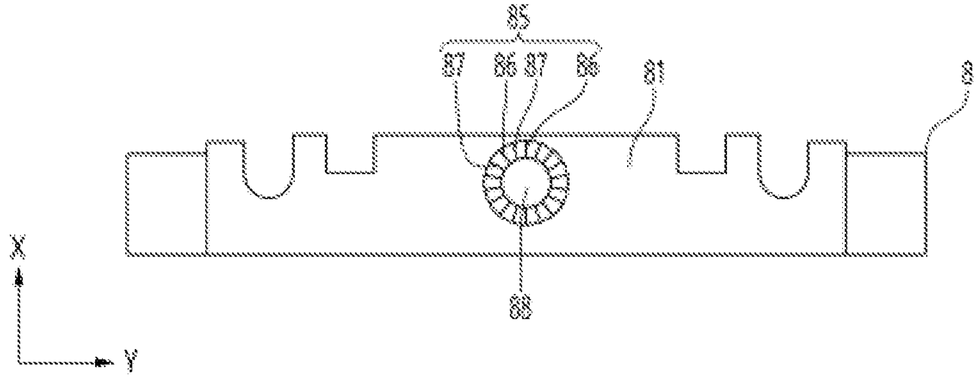

【FIG.11】
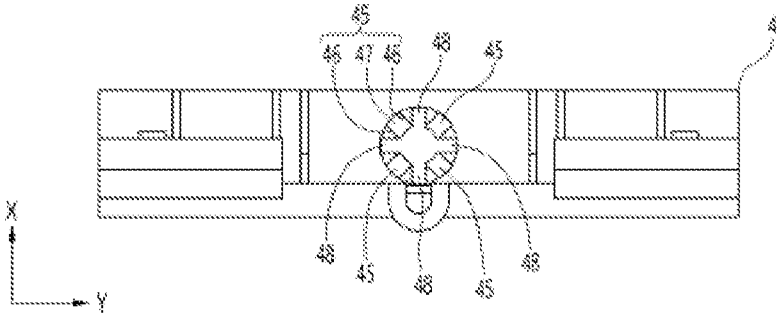

【FIG.12】
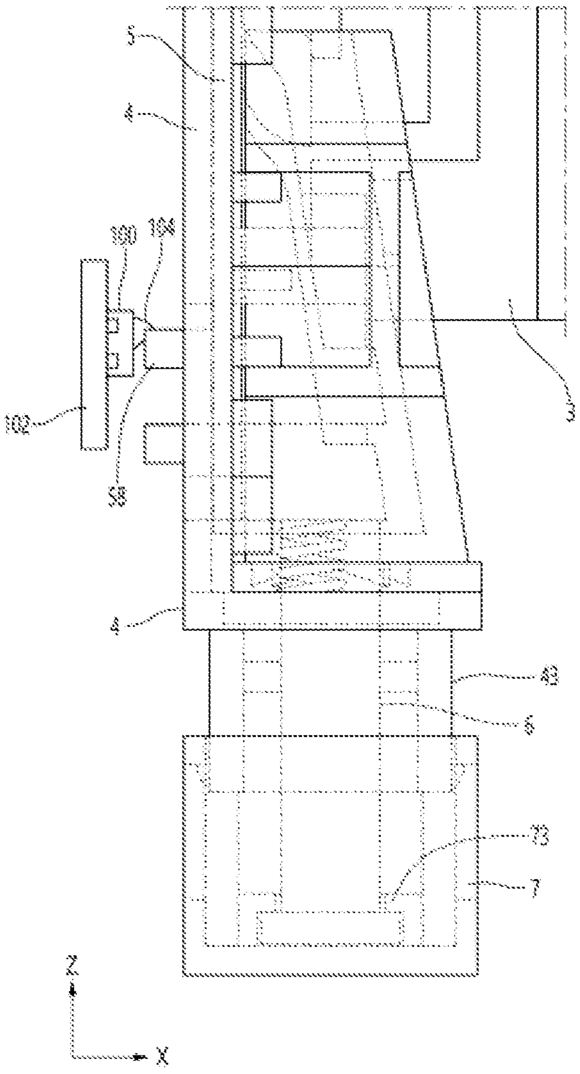

MIRROR ASSEMBLY

CROSS-REFERENCE TO RELATED APPLICATIONS

Pursuant to 35 U.S.C. § 119(a), this application claims the benefit of earlier filing date and right of priority to Korean Patent Application Nos. 10-2023-0030062, filed on Mar. 7, 2023 and 10-2023-0047529 filed on Apr. 11, 2023, the contents of which are all hereby incorporated by reference herein in their entirety.

BACKGROUND

The present disclosure relates to a mirror assembly installed in a vehicle or the like.

An example of a mirror assembly may include a mirror and a mirror support that may be fixed to a glass or roof panel of a vehicle, and an angle of the mirror may be adjustable.

One example in which the angle of the mirror is adjustable includes a rear view assembly disclosed in U.S. Pat. No. 10,800,335 B2 (published on Oct. 13, 2020). The rear view assembly includes a display mirror assembly and an actuator assembly including a toggle switch that is operatively connected to the display mirror assembly to tilt a glass element.

SUMMARY

Embodiments provide a mirror assembly in which an angle of a display panel is easily changeable by simple manipulation of pressing a button.

In one embodiment, a mirror assembly includes: a housing provided with a hinge shaft; a cover provided with a connection portion rotatably coupled to the hinge shaft; a slider disposed between the housing and the cover and provided with a hook; an elevation shaft disposed below the slider; and a button configured to support the elevation shaft, wherein the hook is configured to engage with a hook holder disposed on the housing, wherein the slider comprises a protrusion surface configured to slide along an outer surface of the hook holder based on movement of the slider, and wherein an angle of the slider is varied based on contact between the protrusion surface and the outer surface of the hook holder.

In another embodiment, a mirror assembly includes: a housing; a cover rotatably coupled to the housing; a slider disposed between the housing and the cover; an elevation shaft configured to cause the slider move upward; and a button configured to cause the elevation shaft move upward, wherein the slider comprises a guide portion guided by contact with the housing resulting in a variable angle of the slider while the guide portion is contacting the housing.

The mirror assembly may further include: an outer housing to which the cover is coupled; and a display panel disposed in the outer housing.

The mirror assembly may further include: a glass housing; and a ball shaft supported on the glass housing, wherein the housing may be supported on the ball shaft.

In an embodiment, the cover comprises a slider guide, and the slider comprises a guide shaft configured to be guided by the slider guide.

The mirror assembly may further include a base cover configured to contact a projection disposed on the elevation shaft based on movement of the elevation shaft toward the base cover.

In an embodiment, the base cover comprises an upper contact portion configured to contact the projection when the elevation shaft is moved upward, and the cover comprises a lower contact portion configured to contact the projection when the elevation shaft is moved downward.

In an embodiment, the lower contact portion is one of a plurality of lower contact portions which are spaced apart from each other, and a recess configured to accommodate the projection is defined between adjacent lower contact portions.

In an embodiment, the upper contact portion comprises a plurality of alternating upper peaks and upper valleys.

In an embodiment, the lower contact portion comprises a lower valley defined between two lower peaks.

In an embodiment, the upper peaks of the upper contact portion and the lower peaks of the lower contact portion are misaligned with respect to each other.

The mirror assembly may further include a spring disposed between the cover and the slider.

A space in which the elevation shaft is accommodated may be defined in the button.

A shaft support configured to rotatably support the elevation shaft may be disposed in the button.

The mirror assembly may further include a switching configured to turn the display panel on and off, wherein a slider protrusion configured to switch the switch may be disposed on the slider.

The details of one or more embodiments are set forth in the accompanying drawings and the description below. Other features will be apparent from the description and drawings, and from the claims.

BRIEF DESCRIPTION OF THE DRAWINGS

FIG. 1 is a side view of a mirror assembly according to an embodiment.

FIG. 2 is a side view of the mirror assembly when a button illustrated in FIG. 1 is pressed.

FIG. 3 is an exploded perspective view of the mirror assembly according to an embodiment.

FIG. 4 is a side view illustrating the inside of the mirror assembly according to an embodiment.

FIG. 5 is a side view when the slider is moved downward according to an embodiment.

FIG. 6 is a side view when the slider is moved upward according to an embodiment.

FIG. 7 is a front view illustrating the inside of the mirror assembly according to an embodiment.

FIG. 8 is a perspective view of an elevation shaft according to an embodiment.

FIG. 9 is a perspective view of a base cover according to an embodiment.

FIG. 10 is a bottom view of the base cover according to an embodiment.

FIG. 11 is a plan view of a cover according to an embodiment.

FIG. 12 is a side view when the slider operates a switch according to an embodiment.

DETAILED DESCRIPTION OF THE EMBODIMENTS

Hereinafter, detailed embodiments will be described in detail with reference to the accompanying drawings.

A mirror assembly may be installed in a vehicle to provide a rear view to a driver. An example of the mirror assembly may be a device for protecting the driver's eyes from bright lights of a following vehicle during night driving. An example of the mirror assembly may include an ECM mirror.

The mirror assembly may include a mirror M and a mirror support MS supporting the mirror M.

FIG. 1 is a side view of a mirror assembly according to an embodiment, FIG. 2 is a side view of the mirror assembly when a button illustrated in FIG. 1 is pressed, FIG. 3 is an exploded perspective view of the mirror assembly according to an embodiment, FIG. 4 is a side view illustrating the inside of the mirror assembly according to an embodiment, FIG. 5 is a side view when the slider is moved downward according to an embodiment, and FIG. 6 is a side view when the slider is moved upward according to an embodiment of the present disclosure.

A mirror assembly may include a glass housing 1, a ball shaft 2, a housing 3, a cover 4, a slider 5, an elevation shaft 6, and a button 7. The mirror assembly may further include a base cover 8. The mirror assembly may include an outer housing 9 and a display panel 10.

The housing 3, the cover 4, the slider 5, the elevation shaft 6, and the button 7, the base cover 8, the outer housing 9, and the display panel 10 may constitute a mirror M, and the glass housing 1 and the ball shaft 2 may be a mirror support MS that supports the mirror M.

The glass housing 1 may be attached to a glass of a vehicle.

The glass housing 1 may include a glass attachment body 11 attached to the glass.

The ball shaft 2 may be connected to the glass housing 1. A front ball accommodation portion 12 in which a front ball 21 of the ball shaft 2 is accommodated may be provided in the glass housing 1.

The ball shaft 2 may be supported on the glass housing 1.

In the ball shaft 2, a pair of balls 21 and 22 may be connected to opposite ends of a shaft 23. The pair of balls 21 and 22 and the shaft 23 may be integrated with each other.

The pair of balls 21 and 22 may be spaced apart from each other with the shaft 23 therebetween. The pair of balls 21 and 22 may be disposed on ends of the shaft 23 in a longitudinal direction. The pair of balls 21 and 22 may be spaced apart from each other in a front and rear direction X. Each of the pair of balls 21 and 22 may have a spherical shape or a shape similar to a spherical shape. An outer circumferential surface of each of the pair of balls 21 and 22 may be a curved surface.

The pair of balls 21 and 22 may include a front ball 21 and a rear ball 22.

The front ball 21 may be inserted into the front ball accommodation portion 12 and supported by the glass housing 1.

The rear ball 22 may be inserted into the rear ball accommodation portion 12 provided in the housing 3 to support the housing 3.

The shaft 23 may have a straight-line shape or a bent shape.

A cable accommodation portion 24 (see FIG. 3) in which a cable (not shown) is accommodated may be provided in each of the front ball 21, the rear ball 22, and the shaft 23. The cable accommodation portion 24 may be a recessed groove formed in at least one of the front ball 21, the rear ball 22, or the shaft 23.

The housing 3 may be supported on the ball shaft 2. A rear ball accommodation portion 32 in which the rear ball 22 is inserted and accommodated may be provided in the housing 3. The housing 3 may be fixed in position while being supported by the ball shaft 2.

The housing 3 and the glass housing 1 may be maintained to be spaced apart from each other by the ball shaft 3. In a state in which the glass housing 1 is attached to the glass, the housing 3 may be held up by the glass housing 1 by the ball shaft 2, and the mirror M including the housing 3 may be supported on the mirror support MS including the shaft 3 and the glass housing 1.

The housing 3 may rotatably support the cover 4. A hinge shaft 33 may be provided on the housing 3. The hinge shaft 33 may be disposed above the housing 3. The hinge shaft 33 may be disposed to be elongated in a lateral direction Y of the housing 3. A pair of hinge shafts 33 may be provided on an upper portion of the housing 3. The pair of hinge shafts 33 may be disposed to protrude from the housing 3 in opposite directions.

The housing 3 may further include a holder 34 on which the slider hangs and which limits downward movement of the slider 5.

The holder 34 may be disposed below the hinge shaft 33. The holder 34 may be spaced apart from the hinge shaft 33 in a vertical direction Z.

The holder 34 may be disposed on a central or lower portion of the housing 3. The holder 34 may be disposed to be elongated in the lateral, or left and right direction Y, of the housing 3. The holder 34 may be provided in a pair on the central or lower portion of the housing 3. A pair of holders 34 may be disposed to protrude from the housing 3 in opposite directions.

The housing 3 may be provided with a base cover coupling portion 35 coupled to the base cover 8. The housing 3 may be coupled to the base cover 8 by a coupling member such as a screw.

A connection portion 41 rotatably connected to the hinge shaft 33 may be disposed on the cover 4. The connection portion 41 may be disposed on an upper portion of the cover 4. The connection portion 41 may have a cross-sectional "U" shape. The connection portion 41 may be provided in a pair, like the hinge shaft 33.

The cover 4 may cover the slider 5.

The cover 4 may rotate to be tilted about the hinge shaft 33. The cover 4 may rotate in a clockwise or counterclockwise direction about the hinge shaft 33. The cover 4 may be disposed vertically when the slider 5 is in a lowered position and may be disposed to be tilted at a predetermined angle when the slider 5 is in a raised position.

An outer housing coupling portion 42 that is coupled to the outer housing 9 through a screw or the like may be disposed on the cover 4.

A lower protrusion 43 surrounded by the button 7 may be disposed on the cover 4. The lower protrusion 43 may be disposed on a lower end of the cover 4 to protrude downward.

A slider guide 44 through which the slider 5 is guided may be disposed on the cover 4. The slider guide 44 may be spaced apart from the connection portion 41 in the left and right direction Y. The slider guide 44 may be provided in a pair on the cover 4, and the pair of slider guides 44 may be spaced apart from each other in the vertical direction Z.

The slider 5 may be disposed between the housing 3 and the cover 4. The slider 5 may be disposed to be tilted while being raised between the housing 3 and the cover 4. The slider 5 may be disposed vertically while being lowered between the housing 3 and the cover 4.

A hook 51 may be disposed on the slider 5. The hook 51 may protrude toward the housing 3. The hook 51 may be hooked with the holder 34, and the holder 34 may be a hook holder 34 on which the hook 51 is hooked. Hereinafter, the holder 34 will be described as the hook holder 34.

As illustrated in FIG. 5 when the slider 5 is lowered, the hook 51 may be hooked with the hook holder 34 so as to be secured. When the slider 5 is raised, the hook 51 may disengage from the hook holder 34 and be separated from the hook holder 34 as illustrated in FIG. 6.

A guide shaft 52 may be disposed on the slider 5.

The guide shaft 52 may be guided to the housing 3. The guide shaft 52 may be inserted into the slider guide 44 and be raised and lowered along the slider guide 44. The guide shaft 52 may be slidably fitted into the slider guide 44 in the vertical direction Z and may be secured to the slider guide 44 in the front and rear direction X and the left and right direction Y. The slider 5 may rotate together with the cover 4.

The slider 5 may be provided with a guide portion 53 capable of movement that is guided by the housing 3. When movement of the guide portion 53 is guided by the housing 3, an angle of the slider 5 may vary.

The guide portion 53 may come in contact with or be separated from the housing 3. The guide portion may come in contact with the housing 3 when the slider 5 is raised and may be guided by the housing 3. The guide portion 53 may be spaced apart from the housing 3 when the slider 5 is lowered.

A protrusion referenced with the same reference number as guide portion 53—that is guided along an outer surface of the hook holder 34 may be disposed on the slider 5.

The protrusion 53 may be an example of the guide portion 53 that is guided to the housing 3. Thus, hereinafter, the protrusion and the guide portion will be described with the same reference numeral 53.

The protrusion 53 may protrude from the slider 5 toward the housing 3. The protrusion 53 may be disposed to protrude forward from a front surface of the slider 5, with respect to the X axis direction.

When the slider 5 is lowered, the protrusion 53 may be spaced apart from the outer surface of the hook holder 34 in the vertical direction Z as illustrated in FIG. 5.

When the slider 5 is raised, the protrusion 53 may come in contact with the outer surface of the hook holder 34 and be guided along the outer surface of the hook holder 34 as illustrated in FIG. 6.

A curved surface 35 on which the protrusion 53 is guided may be disposed on the outer surface of the hook holder 34.

The curved surface 35 of the hook holder 34 may be disposed on a surface of the hook holder 34, which faces the slider 5.

The hook holder 34 may be provided so that a width thereof in the front and rear direction gradually decreases toward the downward direction.

The hook holder 34 may include an upper end and a lower end, and a width of the upper end in the front and rear direction may be greater than that of the lower end in the front and rear direction.

The protrusion may include a curved surface 55 that is guided by the curved surface 35 of the hook holder 34.

The protrusion 53 may be provided so that a width thereof in the front and rear direction gradually increases downward. The protrusion 53 may include an upper end and a lower end, and a width of the lower end in the front and rear direction may be greater than that of the upper end in the front and rear direction.

While the movement of the protrusion 53 is guided by the outer surface of the hook holder 34, the angle of the slider 5 may vary. Here, the angle of the slider 5 may be defined as an angle at which the slider 5 rotates to be tilted based on a vertical position of the slider 5.

The angle of the slider 5 may be changed while being raised, and when the angle of the slider 5 is changed, an angle of the cover 4 fitted to be connected to the slider 5 may also be changed, and an angle of the outer housing 9 connected to the cover 4 may vary as illustrated in FIGS. 1 and 2, resulting in an angle of the display panel 10 disposed in the outer housing 9 being varied.

The elevation shaft 6 may be disposed below the slider 5. When the elevation shaft 6 is raised by the button 7, the slider 5 may be raised.

The elevation shaft 6 may be disposed between the slider 5 and the button 7 in the vertical direction Z.

An upper end of the elevation shaft 6 may be in contact with a bottom surface of the slider 5, and a lower end of the elevation shaft 6 may be in contact with the button 7.

When the button 7 is pushed, or raised, the elevation shaft 6 may be raised by the button 7 to allow the slider 5 to rise. The elevation shaft 6 may be a button shaft that transmits external force applied to the button 7 to the slider 5.

The elevation shaft 6 may be rotatably disposed with respect to the button 7.

The elevation shaft 6 may include a shaft 61 and a projection 62 protruding from an outer circumference of the shaft 41.

The projection 62 may be provided in plurality on the shaft 61, and the plurality of projections 62 may be spaced apart from each other along the outer circumference of the shaft 61.

A seating body 63 rotatably seated in the button 7 may be disposed on a lower end of the elevation shaft 6. The seating body 63 may protrude from an outer circumference of the shaft 61.

The button 7 may support the elevation shaft 6. The button 7 may be disposed at a lower side of the outer housing 9 and may be pushed upward by an external force.

The button 7 may be provided in a polygonal shape. A upper surface of the button 7 may be opened. A space 71 accommodating the lower protrusion 43 and the elevation shaft 6 may be defined in the button 7. The button 7 may surround the lower protrusion 43 and may contact the lower protrusion 43 to be secured in a raised position.

A shaft support 73 rotatably supporting the elevation shaft 6 may be disposed in the button 7.

The base cover 8 may limit a range of upward movement of the elevation shaft 6.

The base cover 8 may include a lower plate portion 81 and a pair of side plate portions 82 erected on the lower plate portion 81. A housing coupling portion 83 coupled through a coupling member such as a screw may be disposed on the base cover 8. The housing coupling portion 83 may match the base cover coupling portion 35 in the front and rear direction X.

The outer housing 9 may define an outer appearance of the mirror M. The cover 4 may be coupled to the outer housing 9 and may rotate about the hinge shaft 33 together with the cover 4.

The outer housing 9 may be provided as an assembly of a plurality of members. The outer housing 9 may include a first housing 91 and a second housing 92.

A space in which the display panel 10 is accommodated may be defined inside the first housing 91. An opening through which a screen of the display panel 10 is viewed from the outside of the mirror assembly may be defined in the first housing 91.

The second housing 92 may be coupled to the first housing 91. An opening through which the housing 3 passes may be defined in the second housing 92.

The first housing 91 may be a rear housing in the front and rear direction X, and the second housing 91 may be a front housing disposed in front of the rear housing.

The first housing 91 may be a front panel that is seen by the driver in the driver's view point, and the second housing 92 may be a rear case disposed in front of the front panel in the driver's view point.

The display panel 10 may be disposed in the outer housing 9.

When the slider 5 is raised, the slider 5 may rise based on the housing 3, and the cover 4 to which the slider 5 is connected may also rise while pivoting about the hinge shaft 33.

When the slider 5 is lowered, the slider 5 may also be lowered along the housing 3 and be hooked on the housing 3, and the cover 4 to which the slider 5 is connected may pivot back about the hinge shaft 33 to return to its original position.

FIG. 7 is a front view illustrating the inside of the mirror assembly according to an embodiment, FIG. 8 is a perspective view of the elevation shaft according to an embodiment, FIG. 9 is a perspective view of the base cover according to an embodiment, FIG. 10 is a bottom view of the base cover according to an embodiment, and FIG. 11 is a plan view of the cover according to an embodiment.

The mirror assembly may further include springs S1 and S2. One example of the springs S1 and S2 may be a coil spring. The springs S1 and S2 may assist an operation of the button 7 and positional movement of the slider 5.

Each of the springs S1 and S2 may include a first spring S1 elastically supporting the slider 5. The first spring S1 may elastically support the slider 5 downward.

The first spring S1 may be disposed between the cover 4 and the slider 5 or between the housing 3 and the slider 5.

An example of the first spring S1 may be a coil spring. An upper end of the first spring S1 may be in contact with the cover 4, and a lower end of the first spring S2 may be in contact with the slider 5.

When the slider 5 is raised, the first spring S1 may be compressed to elastically support the slider 5 downward.

The springs S1 and S2 may include the second spring S2 spaced apart from the first spring S1.

The second spring S2 may elastically support the slider 5 upward. The second spring S2 may be disposed between the cover 4 and the slider 5.

A lower plate portion on which the second spring S2 is placed may be disposed on the cover 4, and a second spring accommodation portion in which a portion or all of the second spring S2 is accommodated may be provided in the slider 5.

An example of the second spring S2 may be a coil spring. An upper end of the second spring S2 may be in contact with the second spring accommodation portion of the slider 5, and a lower end of the second spring S2 may be in contact with the lower plate portion of the cover 4.

The second spring S2 may be provided in a pair, and the pair of second springs S2 may be spaced apart from each other in the left and right direction Y. One of the pair of second springs S2 may be closer to a left end of the slider 5, and the other of the pair of second springs S2 may be closer to the right end of the slider 5.

The second spring S2 may be compressed when the slider 5 is lowered and may elastically support the slider 5 upward.

When the springs S1 and S2 includes both the first spring S1 and the second spring S2, the springs S1 and S2 may elastically support the slider 5 downward when external force is not applied to the button 7.

The plurality of projections 62 of the elevation shaft 6 may be disposed laterally along the shaft 61 of the elevation shaft 6 at equal intervals. For example, four projections 62 may be spaced apart from each other along a circumferential direction of the shaft 61 and may be disposed at equal intervals, however the present disclosure is not limited thereto.

As illustrated in FIG. 8, each of the projections 62 of the elevation shaft 6 may be provided in an angular shape. Each of top and bottom surfaces of the projection 62 may have an angular shape. Each of an upper end 62*a* and a lower end 62*b* of the projection 62 may have a pointed shape. The upper end 62*a* of the projection 62 and the lower end 62*b* of the projection 62 may not be aligned with each other in the vertical direction Z.

An upper contact portion 85 may be disposed on the base cover 8. When the projection 62 is raised, the projection 62 may come in contact with the upper contact portion 85.

The upper contact portion 85 may be provided to protrude downward from the bottom surface of the lower plate portion 81 of the base cover 8.

As illustrated in FIG. 10, the upper contact portion 85 may be provided in a ring shape. In the upper contact portion 85, peaks 86 and valleys 87 may be alternately disposed along the upper contact portion 85.

When the projection 62 is raised, the upper end 62*a* of the projection 62 may be inserted between the peaks 86 of the upper contact portion 85, and the upper end 62*a* of the projection 62 may be secured against the contact portion 85.

A shaft through-hole 88 may be defined in the base cover 8. The shaft 61 of the elevation shaft 6 may pass through the shaft through-hole 88.

When the elevation shaft 6 is raised, the upper end 62*a* of the projection 62 of the elevation shaft 6 may be guided along an angled surface between a peak 86 and an adjacent valley 87, and the elevation shaft 6 may be guided by the upper contact portion 85 to rotate by a predetermined degree of rotation.

A lower contact portion 45 may be disposed on the cover 4. When the projection 62 is lowered, the projection 62 may come in contact with the lower contact portion 45.

The lower contact portion 45 may be disposed inside the lower protrusion 43 of the cover 4.

As illustrated in FIG. 11, in the lower contact portion 45, peaks 46 and valleys 47 may be alternately disposed. A pair of peaks 46 may be disposed on the lower contact portion 45, and the valley 47 may be disposed between the pair of peaks 46.

When the projection 62 descends, the lower end 62*b* of the projection 62 may be inserted between the peaks 46 of the lower contact portion 45, and the lower end 62*b* of the projection 62 may be secured against the lower contact portion 85.

The lower contact portion 45 may be provided in plurality, like the projection 62, and the projection 62 and the lower contact portion 45 may correspond one-to-one to each other. The number of lower contact portions 45 may be the same as the number of projections 62, however the present disclosure is not limited thereto.

The plurality of lower contact portions 45 may be spaced apart from each other, and a hole 48 into which the projection 62 may be inserted in the vertical direction Z may be defined between adjacent lower contact portions 45.

The hole 48 may be provided in plurality, like the projection 62, and the projection 62 and the hole 48 may correspond one-to-one to each other, however the present disclosure is no limited thereto.

The peak 86 of the upper contact portion 85 and the peak 46 of the lower contact portion 45 may be misaligned with each other in the vertical direction.

When the elevation shaft 6 is lowered, the lower end 62*b* of the projection 62 of the elevation shaft 6 may be guided along an angled surface between the peak 46 and the valley 47, and the elevation shaft 6 may be guided by the lower contact portion 45 to rotate by a predetermined degree.

Hereinafter, an operation of the mirror assembly will be described.

First, when the button 7 is engaged by an external force, the elevation shaft 6 may be raised by the button 7, and the projection 62 of the elevation shaft 6 may pass through the hole 48 (see FIG. 11) to rise above the hole 48. The projection 62 passing through the hole 48 may come in contact with the upper contact portion 85 (see FIGS. 9 and 10) and be guided along an angled surface between a peak 86 and a valley 87 of the upper contact portion 85, and while the projection 62 is guided by the angled surface, the elevation shaft 6 may rotate by a predetermined degree by the upper contact portion 85.

As the elevation shaft 6 rotates, the projection 62 of the elevation shaft 6 may be disposed above the lower contact portion 45 (see FIG. 11) and may be disposed between the upper contact portion 85 (see FIG. 10) and the lower contact portion 45 (see FIG. 11) with respect to the vertical direction Z.

When the external force applied to the button 7 is removed, the projection 62 may be lowered to come in contact with the lower contact portion 45 and be guided along an angled surface between a peak 46 and a valley 47 of the lower contact portion 45, and while the projection 62 is guided by the angled surface, the elevation shaft 6 may rotate by a predetermined degree by the lower contact portion 85.

The projection 62 of the elevation shaft 6 may be secured against the lower contact portion 45, and the projection 62 may be maintained between the upper contact portion 85 and the lower contact portion 45, and thus, limits of a range of vertical movement of the slider 5 based on movement of the elevation shaft 6 may be defined.

In the state in which the slider 5 is raised, the button 7 may be engaged again, thus raising the elevation shaft 6 again via the button 7, and the projection 62 may come into contact with the upper contact portion 85 again so as to be guided along an angled surface between a peak 86 and a valley 87 of the upper contact portion 85. The elevation shaft 6 may rotate once more by a predetermined degree by the upper contact portion 85, and when the elevation shaft 6 rotates, the projection 62 may be disposed above the hole 48.

Thereafter, when the external force applied to the button 7 is removed, the projection 62 may be lowered into the hole 48 and be inserted into the hole 48. The elevation shaft 6 may be lowered, and the projection 62 may be disposed adjacent to the lower contact portion 45.

When the projection 62 is lowered, the slider 5 may be lowered together with the elevation shaft 6, and the hook 51 of the slider 5 may be hooked with the hook holder 34 of the housing 3, as illustrated in FIG. 5.

FIG. 12 is a side view depicting operation of a switch via the slider according to an embodiment.

The mirror assembly may further include a switch 100 that turns on/off the display panel 10.

The switch 100 may be disposed inside the outer housing 9.

An example of the switch 100 may be a mechanical switch or a single pole single throw (SPST).

The switch 100 may be mounted on a substrate 102 and may be spaced apart from the slider 5 in the front and rear direction X.

The switch 100 may have an operating knob 102 disposed on a surface facing the slider 5. The operating knob 102 may be rotatably disposed on the switch 100.

When the switch 100 is switched on, current may be applied to the display panel 10 to turn on the display panel 10, and when the switch 100 is switched off, the switch 100 may block the current to the display panel 10 to turn off the display panel 10.

A slider protrusion 58 that switches the switch 100 may be disposed on the slider 5.

The slider protrusion 58 may be disposed to protrude toward the switch 100. The slider protrusion 58 may protrude from a rear surface of the slider 5.

When the slider 5 is raised, the slider protrusion 58 may allow the knob 102 to rotate, turn off the switch 100, and turn off the display panel 10.

When the slider 5 is lowered, the slider protrusion 58 may allow the knob 102 to rotate back, turn on the switch 100, and turn on the display panel 10.

According to embodiments of the present disclosure, the angle of the display panel may be easily changed in a push button manner.

In addition, when the button is pressed once, the button may be raised so that the pressed state of the button is maintained, and when the button is additionally pressed one more time, the button may be lowered, and the manipulation for changing the angle of the display panel may be easy for a user to perform, for example while operating a vehicle.

In addition, the button may smoothly return to its original position through the simple structure of the spring that elastically supports the slider.

In addition, the display panel may be conveniently turned on/off by pressing the button.

In addition, there may be the advantage in that a separate sensor for turning the display panel on/off is unnecessary, and the cost is low due to the simple structure of the switch.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A mirror assembly comprising:

a housing provided with a hinge shaft;

a cover provided with a connection portion rotatably coupled to the hinge shaft;

a slider disposed between the housing and the cover and provided with a hook;

an elevation shaft disposed below the slider; and a button configured to support the elevation shaft, wherein the hook is configured to engage with a hook holder disposed on the housing, wherein the slider comprises a protrusion surface configured to slide along an outer surface of the hook holder based on movement of the slider, and wherein an angle of the slider is varied based on contact between the protrusion surface and the outer surface of the hook holder, wherein the elevation shaft is configured to be raised by the button being pressed, and raising of the elevation shaft raises the slider, and wherein the slider is raised or lowered between the housing and the cover, wherein the cover comprises a slider guide configured to accommodate a guide shaft of the slider along a lengthwise direction of the guide shaft, and wherein the guide shaft is configured to move linearly along the lengthwise direction within the slider guide, the movement corresponding to raising or lowering of the slider, wherein the button comprises a space configured to accommodate the elevation shaft, wherein the button comprises a shaft support configured to rotatably support the elevation shaft.

2. The mirror assembly according to claim 1, further comprising a base cover configured to contact a projection disposed on the elevation shaft based on movement of the elevation shaft toward the base cover.

3. The mirror assembly according to claim 2, wherein the base cover comprises an upper contact portion configured to contact the projection when the elevation shaft is moved upward, and wherein the cover comprises a lower contact portion configured to contact the projection when the elevation shaft is moved downward.

4. The mirror assembly according to claim 3, wherein the lower contact portion is one of a plurality of lower contact portions which are spaced apart from each other, and a recess configured to accommodate the projection is defined between adjacent lower contact portions.

5. The mirror assembly according to claim 3, wherein the upper contact portion comprises a plurality of alternating upper peaks and upper valleys.

6. The mirror assembly according to claim 5, wherein the lower contact portion comprises a lower valley defined between two lower peaks.

7. The mirror assembly according to claim 6, wherein the upper peaks of the upper contact portion and the lower peaks of the lower contact portion are misaligned with respect to each other.

8. The mirror assembly according to claim 1, further comprising a spring disposed between the cover and the slider.

9. The mirror assembly according to claim 1, further comprising:

an outer housing coupled to the cover; and a display panel disposed in the outer housing.

10. The mirror assembly according to claim 9, further comprising a switch configured to turn the display panel on and off, wherein the slider comprises a protrusion configured to engage the switch.

11. The mirror assembly according to claim 1, further comprising:

a glass housing; and a ball shaft coupled to the glass housing, wherein the housing is coupled to the ball shaft.

12. A mirror assembly comprising:

a housing;

a cover rotatably coupled to the housing;

a slider disposed between the housing and the cover;

an elevation shaft configured to cause the slider move upward; and a button configured to cause the elevation shaft move upward, wherein the slider comprises a guide portion guided by contact with the housing resulting in a variable angle of the slider while the guide portion is contacting the housing, wherein the elevation shaft is configured to be raised by the button being pressed, and raising of the elevation shaft raises the slider, wherein the slider is raised or lowered between the housing and the cover, wherein the cover comprises a slider guide configured to accommodate a guide shaft of the slider along a lengthwise direction of the guide shaft, and wherein the guide shaft is configured to move linearly along the lengthwise direction within the slider guide, the movement corresponding to raising or lowering of the slider, wherein the button comprises a space configured to accommodate the elevation shaft, wherein the button comprises a shaft support configured to rotatably support the elevation shaft.

13. The mirror assembly according to claim 12, further comprising a spring disposed between the cover and the slider.

14. The mirror assembly according to claim 12, further comprising:

an outer housing coupled to the cover;

a display panel disposed in the outer housing; and a switch configured to turn the display panel on and off, wherein the slider comprises a protrusion configured to engage the switch.

* * * * *